United States Patent
Naranjo et al.

(10) Patent No.: US 8,750,695 B2
(45) Date of Patent: Jun. 10, 2014

(54) DEVICE FOR HEATING LIQUID AND GENERATING STEAM

(75) Inventors: Aldozkar D'Herrera Naranjo, Benito Juarez (MX); John Dorsett, Anniston, AL (US)

(73) Assignee: International Green Boilers, LLC, Oxford, AL (US)

( * ) Notice: Subject to any disclaimer, the term of this patent is extended or adjusted under 35 U.S.C. 154(b) by 0 days.

(21) Appl. No.: 13/816,126

(22) PCT Filed: Aug. 9, 2011

(86) PCT No.: PCT/US2011/047110
§ 371 (c)(1),
(2), (4) Date: Aug. 21, 2013

(87) PCT Pub. No.: WO2012/021533
PCT Pub. Date: Feb. 16, 2012

(65) Prior Publication Data
US 2013/0322860 A1    Dec. 5, 2013

Related U.S. Application Data

(60) Provisional application No. 61/372,062, filed on Aug. 9, 2010.

(51) Int. Cl.
*F24H 1/20* (2006.01)

(52) U.S. Cl.
USPC .......................................................... 392/451

(58) Field of Classification Search
USPC ......... 392/451, 441–447, 276, 503, 311–338; 219/437, 523, 525
See application file for complete search history.

(56) References Cited

U.S. PATENT DOCUMENTS

| | | | |
|---|---|---|---|
| 1,728,450 A | | 9/1929 | Slisz |
| 2,598,490 A | * | 5/1952 | Berg et al. ...................... 392/328 |
| 3,398,261 A | * | 8/1968 | Mays ............................. 392/329 |
| 3,780,261 A | * | 12/1973 | Eaton-Williams ............ 392/326 |
| 4,163,895 A | | 8/1979 | Hauser et al. |
| 4,640,233 A | * | 2/1987 | Draper et al. ................. 122/488 |
| 4,730,098 A | * | 3/1988 | Cave ............................. 392/314 |
| 5,273,635 A | | 12/1993 | Gernert et al. |

(Continued)

FOREIGN PATENT DOCUMENTS

| | | |
|---|---|---|
| EP | 0672861 | 9/1995 |
| WO | WO9006482 | 6/1990 |
| WO | WO2005093130 | 10/2005 |

OTHER PUBLICATIONS

Yang Kyung Jinn "International Search Report and Written Opinion" Korean Intellectual Property Office; Mar. 8, 2012, pp. 1-11.

*Primary Examiner* — Dana Ross
*Assistant Examiner* — Renee L Miller
(74) *Attorney, Agent, or Firm* — Thomas G. Peterson; Bradley Arant Boult Cummings LLP

(57) ABSTRACT

The present disclosure relates generally to devices and systems to heat a liquid and/or generate steam from a liquid. In a specific embodiment, the present disclosure relates generally to devices and systems to heat a liquid and/or generate steam from a liquid using molecular friction and/or nucleation. The devices and systems of the present disclosure may be used in any application where a heated liquid or steam are required and operate at reduced energy costs and carbon footprints as compared to devices of the prior art.

25 Claims, 6 Drawing Sheets

(56) References Cited

U.S. PATENT DOCUMENTS

| | | |
|---|---|---|
| 6,640,048 B2 | 10/2003 | Novotny et al. |
| 7,216,484 B2 | 5/2007 | Villalobos |
| 7,734,158 B2 * | 6/2010 | Kondo et al. .................. 392/325 |
| 2002/0073938 A1 | 6/2002 | Bool et al. |
| 2009/0084293 A1 | 4/2009 | Morin et al. |

* cited by examiner

DEVICE FOR HEATING LIQUID AND GENERATING STEAM

CROSS-REFERENCE TO RELATED APPLICATIONS

This application is a national stage under 35 U.S.C. 371 of International Application PCT/US2011/047110, filed on Aug. 9, 2011 (currently pending). International Application PCT/US2011/047110 cites the priority of U.S. Patent Application 61/372,062, filed Aug. 9, 2010 (expired).

FIELD OF THE DISCLOSURE

The present disclosure is generally directed to devices for heating liquids and generating steam.

BACKGROUND

The prior art is aware of a number of devices that heat liquids and/or generate steam. In such devices, a tank or vessel is generally provided for receiving/storing the liquid, the vessel having an inlet for the liquid to enter, an outlet to allow the heated liquid and/or steam to exit and a heating element or heat source to heat the liquid and/or generate steam. Examples of such prior art device include storage water heaters, tankless water heaters and boilers. It is common to use electricity and/or gas as the energy source to heat the liquid and/or generate steam. Such devices known in the art suffer from a number of drawbacks.

In storage water heaters, a standard heating element powered by electrical current is typically employed; a natural gas heating system may also be employed. The heating element is generally of low power and requires a considerable amount of time to heat the liquid and/or generate steam. In addition, such devices require complicated control systems to automate operation. The heating elements of such devices may also become fouled by minerals and contaminant in the liquid, further reducing the efficiency of the system and increasing the cost of operation. In addition, storage water heaters expend energy to keep a quantity of liquid heated at all times so it is ready for use on demand.

Boilers are generally larger systems designed to heat larger quantities of a liquid and commonly utilize a combustion system to heat the liquid. Furthermore, due to the design of such devices, they generally require a large space for installation. Due to safety concerns (such as explosion and gas leakage), such devices are generally required to be installed at a distant point to where the heated water and/or steam are used. The noise generated by such systems also dictates that they be installed at a distant point to where the heated water and/or steam are used.

This requires transport of the heated water and/or steam to such distant point, with a resulting loss of energy due to transport and increased energy consumption as a result of the transport process. In addition, prior art devices also generate substantial amounts of pollution into the environment. The heating process also is inefficient, meaning that a portion of the energy provided to the device is not utilized in heating the liquid and/or generating steam (net energy loss).

The present disclosure provides a device for heating a liquid and/or generating steam that addresses the disadvantages known in the art. The device of the present disclosure provides for liquid heating and steam generation such that the net energy loss associated with prior art devices is reduced or substantially eliminated. The devices of the present disclosure are also safer to operate as they do not utilize a combustion system or gas power. Due to the efficient design of the device, it also requires a much smaller footprint for installation. Due to the above improvements, the device can be placed at the point where heated water and/or steam are consumed, reducing energy loss inherent in transport of the heated water and/or steam.

The device of the present disclosure also contains a mineral/contaminant removal system which collects minerals and other impurities in the liquid for subsequent removal. As a result, the device of the present disclosure operates more efficiently than devices of the prior art and may be used in additional processes as well, such as but not limited to, desalinization and water purification.

The device is also designed to be modular and flexible in operation, allowing the device to be operated at a number of different voltages and reducing maintenance costs. The foregoing feature allows the device to receive different types of voltage varying its thermal energy production without the need to trigger changes in its components.

The foregoing improvements address unsolved problems in the art and address long-felt needs in the art.

SUMMARY OF THE DISCLOSURE

Figure 1:
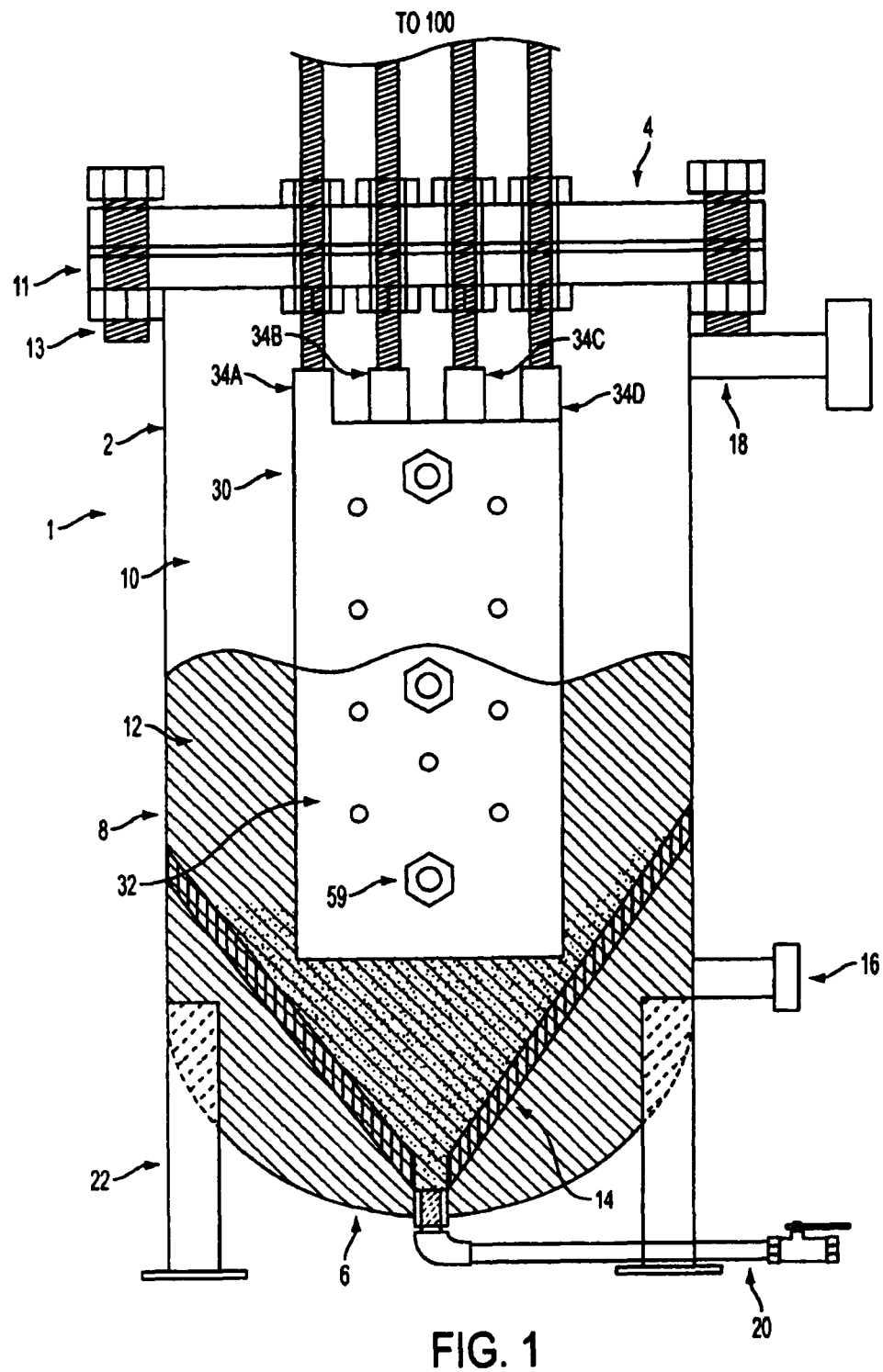
FIG. 1 shows one embodiment of the device of the present disclosure.

In a first aspect, the present disclosure provides a device for heating a fluid.

In a second aspect, the present disclosure provides a device for generating steam.

In a third aspect, the present disclosure provides a device for removing impurities from a waste-fluid.

In a fourth aspect, the present disclosure provides a device for desalinization of a liquid. In a fifth aspect, the device of the first through forth aspects comprises a vessel having an interior portion for containing a liquid under pressure and a transfer unit in the interior portion, the transfer unit comprising a plurality of activators, with each of the activators comprising 2 membranes, each of the membranes having a first end and a second end, and each of the membranes of each activator being in communication with the other on one of the first and second ends, wherein one of the activators is a ground activator and at least one of the activators is a hot activator, the hot activator being in communication with a power source to supply power to the hot activator.

In a sixth aspect, the device of the fifth aspect comprises a first activator and a second activator, wherein the first activator is a ground activator and the second activator is a hot activator, wherein an end of at least one membranes of the second activator is in contact with the ground activator and the device receives 120 volts alternating current.

In a seventh aspect, the device of the fifth aspect comprises a first activator, a second activator and a third activator, wherein the first activator is a ground activator and the second and third activators are hot activators, wherein an end of at least one membranes of the second and third activators is in contact with the ground activator and the device receives 220 volts alternating current.

In an eighth aspect, the device of the fifth aspect comprises a first activator, a second activator, a third activator and a fourth activator, wherein the first activator is a ground activator—and the second, third and fourth activators are hot activators, wherein an end of at least one membranes of the second, third and fourth activators is in contact with the ground activator and the device receives 440 volts alternating current.

In ninth aspect, the device of the fifth aspect comprises a first activator, a second activator, a third activator, a fourth activator and a fifth activator, wherein the first activator is a ground activator and the second, third, fourth and fifth activators are hot activators, wherein an end of at least one membranes of the second, third and fourth activators is in contact with the ground activator and the device receives 680 volts alternating current.

In a tenth aspect, the device of the fifth through ninth aspects further comprises a control unit to regulate power supplied to the hot activator and to optionally regulate one or more functions of the device.

In an eleventh aspect, the device of the fifth through ninth aspects further comprises one or more openings at least one membrane of the hot activators to capture an impurity present in the liquid, wherein the one or more openings are in communication with a bottom portion of the interior.

In a twelfth aspect, the present disclosure provides a device of the first through eleventh aspects that provides the aforementioned properties at a reduced cost to the consumer.

In a thirteenth aspect, the present disclosure provides a device of the first through eleventh aspects that provides the aforementioned properties while providing the benefit of reduced pollutant emission and a reduced carbon footprint compared to currently available alternatives.

In a fourteenth aspect, the present disclosure provides a device of the first through eleventh aspects that provides the aforementioned properties while providing increased safety for the user. As a result, the device of the present disclosure can be placed closer to the point of use.

In a fifteenth aspect, the present disclosure provides a device of the first through eleventh aspects that provides the aforementioned properties while providing a reduced physical footprint for the device.

In a sixteenth aspect, the present disclosure provides a device of the first through fifteenth aspects for generating steam and heating a fluid utilizing molecular friction and nucleation.

DETAILED DESCRIPTION

General Background

Friction is the force resisting the relative lateral (tangential) motion of solid surfaces, fluid layers, or material elements in contact. Friction is usually subdivided into several varieties including dry friction, lubricated friction, fluid friction, skin friction and internal friction. Fluid friction used to describe the friction between layers within a fluid that are moving relative to each other. Internal friction is the force resisting motion between the elements making up a solid material while it undergoes deformation.

Friction is not a fundamental force, as it is derived from electromagnetic force between charged particles, including electrons, protons, atoms, and molecules. Because of the complexity of these interactions friction must be determined empirically. When contacting surfaces or molecules move relative to each other, the friction between the two surfaces converts kinetic energy into thermal energy, or heat. As energy is applied to a system, such as a liquid, this energy is transferred to the liquid. As a result, the molecules of liquid gain energy and increase in motion relative to one another. As a result, friction is generated and liquid is heated.

As the liquid is heated, nucleation sites may form. Nucleation is the extremely localized budding of a distinct thermodynamic phase. Some examples of phases that may form via nucleation in liquids are gaseous bubbles, crystals or glassy regions. Creation of liquid droplets in saturated vapor is also characterized by nucleation. Nucleation normally occurs at nucleation sites on surfaces contacting the liquid. Suspended particles or minute bubbles also provide nucleation sites (heterogeneous nucleation). Nucleation without preferential nucleation sites is homogeneous nucleation. Homogeneous nucleation occurs spontaneously and randomly, but it requires superheating or supercooling of the medium.

Nucleation in boiling can occur in the bulk liquid if the pressure is reduced so that the liquid becomes superheated with respect to the pressure-dependent boiling point. More often nucleation occurs on the heating surface, at nucleation sites. Typically, nucleation sites are tiny crevices where free gas-liquid surface is maintained or spots on the heating surface with lower wetting properties. Substantial superheating of a liquid can be achieved after the liquid is de-gassed and if the heating surfaces are clean, smooth and made of materials well wetted by the liquid. Nucleation generally occurs with much more difficulty in the interior of a uniform substance, by a process called homogeneous nucleation. The creation of a nucleus implies the formation of an interface at the boundaries of a new phase.

Liquids cooled below the maximum heterogeneous nucleation temperature (melting temperature), but which are above the homogeneous nucleation temperature (pure substance freezing temperature) are said to be supercooled. Supercooling brings about supersaturation, the driving force for nucleation. Supersaturation occurs when the pressure in the newly formed solid is less than the vapor pressure, and brings about a change in free energy per unit volume, $G_v$, between the liquid and newly created solid phase. This change in free energy is balanced by the energy gain of creating a new volume, and the energy cost due to creation of a new interface. When the overall change in free energy, $\Delta G$ is negative, nucleation is favored.

Some energy is consumed to form an interface, based on the surface energy of each phase. If a hypothetical nucleus is too small (known as an unstable nucleus or "embryo"), the energy that would be released by forming its volume is not enough to create its surface, and nucleation does not proceed. The critical nucleus size can be denoted by its radius, and it is when $r=r^*$ (or r critical) that the nucleation proceeds.

For example in the classic case of a spherical cluster that liberates $-G_v$ Joules per cubic centimeter during formation (here $G_v$ is a negative quantity), but which must pay the positive cost of a Joules per square centimeter of surface interfacing with the surrounding, the free energy needed to form a cluster of radius r is $$\Delta G = \frac{4}{3}\pi r^3 G_v + 4\pi r^2 \sigma$$

Where the first term shows the energy gain of creating a new volume and the second term shows the energy loss due to surface tension of the new interface.

It costs free energy to add molecules to this cluster $$\left(\text{because } \frac{dG}{dr} > 0\right)$$

until the radius reaches $$r^* = -\frac{2\sigma}{G_v}$$

$$\text{where } \frac{dG}{dr} = 0$$

Addition of new molecules to clusters larger than this critical radius releases, rather than costs, available work. In other words at that point growth of the cluster is no longer limited by nucleation, but perhaps by diffusion[4] (i.e. the supply of molecules) or by reaction kinetics instead.

The free energy needed to form this critical radius can be found by $$\Delta G^* = \frac{16\pi\sigma^3}{3(G_v)^2}$$

which occurs at the maximum AG where dG/dr=0

As the phase transformation becomes more and more favorable, the formation of a given volume of nucleus frees enough energy to form an increasingly large surface, allowing progressively smaller nuclei to become viable. Eventually, thermal activation will provide enough energy to form stable nuclei. These can then grow until thermodynamic equilibrium is restored.

A greater degree of supercooling favors phase transformation, and we can relate AG to supercooling and find r* and $\Delta G^*$ as a function of $\Delta T$ $$R^* = \frac{2\sigma T_m}{\Delta H_s} \frac{1}{\Delta T}$$

and $$\Delta G^* = \frac{16\pi\sigma^3 T_m^2}{3\Delta H_s^2} \frac{1}{(\Delta T)^2}$$

The greater the supercooling, the smaller the critical radius and the less energy needed to form it.

The spontaneous nucleation rate in, say, water changes very rapidly with temperature, so the spontaneous nucleation temperature can be quite well defined. 'Film boiling' on very hot surfaces and the Leidenfrost effect are both believed to be stabilized by spontaneous nucleation phenomena.

Heterogeneous nucleation occurs much more often than homogeneous nucleation. It forms at preferential sites such as phase boundaries or impurities and requires less energy than homogeneous nucleation. At such preferential sites, the effective surface energy is lower, thus diminished the free energy barrier and facilitating nucleation. Surfaces promote nucleation because of wetting—contact angles greater than zero between phases encourage particles to nucleate. The free energy needed for heterogeneous nucleation is equal to the product of homogeneous nucleation and a function of the contact angle:

$$\Delta G_{heterogeneous} = \Delta G_{homogeneous} * f(\theta)$$

where $$f(\theta) = \frac{1}{2} + \frac{3}{4}\cos\theta - \frac{1}{4}\cos^3\theta$$

The barrier energy needed for heterogeneous nucleation is reduced, and less supercooling is needed. The wetting angle determines the ease of nucleation by reducing the energy needed. It is important to note that the critical radius remains unchanged. However, the volume can be significantly less for heterogeneous nucleation due to the wetting angle affecting the shape of the cluster.

In the case of heterogeneous nucleation, some energy is released by the partial destruction of the previous interface. For example, if a carbon dioxide bubble forms between water and the inside surface of a bottle, the energy inherent in the water-bottle interface is released wherever a layer of gas intervenes, and this energy goes toward the formation of bubble-water and bubble-bottle interfaces. The same effect can cause precipitate particles to form at the grain boundaries of a solid. This can interfere with precipitation strengthening, which relies on homogeneous nucleation to produce a uniform distribution of precipitate particles.

The nucleation rate, I, depends on the average number of critical clusters, n* and the diffusion of molecules to the cluster, β.

$$I = n^*\beta$$

where the average population of critical nuclei is $$n^* = N\exp\left(\frac{-\Delta G^*}{k_B T}\right)$$

where: $\Delta G^*$ is critical free energy needed; N is the number of potential nucleation sites per unit volume; and $k_B$ is the Boltzmann constant The number of clusters of a certain size formed is a function of the total number of atoms in the system, the free energy to create a cluster (of that size), and the temperature. The number of clusters increases with increasing temperature.

At very low temperatures, rate of diffusion is low. As temperature increases, the rate of diffusion increases; molecules are able to get to the site of nucleation at a fast enough rate to promote growth of the nucleus. At temperatures significantly below melting temperature, fluctuation of molecules is very low; the molecules are in a low energy state and do not have enough energy to move around and nucleate. Nucleation rate is dominated by diffusion. However, as temperature increases, molecular fluctuations increase and molecules tend to escape from the nucleus, causing a decreased rate of nucleation.

Without being bound by any theory, the processes of friction and nucleation caused by the device of the present disclosure can cause the beneficial effects of liquid heating and steam generation at reduced costs and reduced carbon footprint.

DESCRIPTION OF EMBODIMENTS

In the following discussion certain articles and methods will be described for background and introductory purposes. Nothing contained herein is to be construed as an "admission" of prior art. Applicant expressly reserves the right to demonstrate, where appropriate, that the articles and methods referenced herein do not constitute prior art under the applicable statutory provisions.

The devices of the present disclosure provide a vessel for receiving a fluid, optionally under pressure, the vessel having an interior portion containing one or more transfer units to efficiently heat a liquid and/or generate steam. In a specific embodiment, the fluid is water; however, the fluid may be any aqueous fluid that contains hydrogen. The transfer unit heats the fluid in the tank to generate a heated liquid and/or steam as described herein.

FIG. 1 shows one embodiment of the device 1 of the present disclosure. The device 1 comprises a vessel 2 having a top 4 and a bottom 6, a side wall 8 joining the top 4 and bottom 6, thereby forming an interior portion 10. In one embodiment, the top wall 4 is removably secured to the side wall 8 of the device 1 through the use of flanges 11a and 11b and bolts 13, allowing access to the interior 10. The vessel 2 functions to provide a compartment to contain a liquid 12 and the parts of the device 1 in a convenient manner. The vessel 2 may be of any shape desired so long as the above functions are maintained; for example, the vessel 2 may have a square, rectangular, oval or circular cross section. In one embodiment, the vessel 2 comprises a convex bottom 14. The convex bottom 14 may form the bottom 6 of the vessel 2 or may be located in the interior portion 10 with the bottom 6 of the vessel 2 surrounding at least a portion of the convex bottom 14.

The vessel 2 further comprises at least one of a liquid inlet 16, a liquid/steam outlet 18 and a drain outlet 20. The inlet 16 is in communication with the interior portion 10 and may be in communication with a source for a liquid. The outlet 18 is in communication with the interior portion 10 and may be in communication with a device to utilize the heated liquid/steam generated by the device 1 or a storage tank for storing (in one embodiment temporarily) the heated liquid/steam generated by the device. The drain outlet 20 is in communication with the interior portion 10 and may be in communication with a storage tank to store impurities removed from the liquid during operation of the device 1. The inlet 16 and outlet 18 may be positioned at various positions on the vessel 2. In one embodiment, the inlet 16 is positioned on a lower portion of the vessel 2 and the outlet 18 is positioned on an upper portion of the vessel 2. The drain outlet 20 may be positioned on the bottom 6 of the vessel 2; in one embodiment, the outlet 20 is in communication with the apex of the convex bottom 14.

Figure 5:
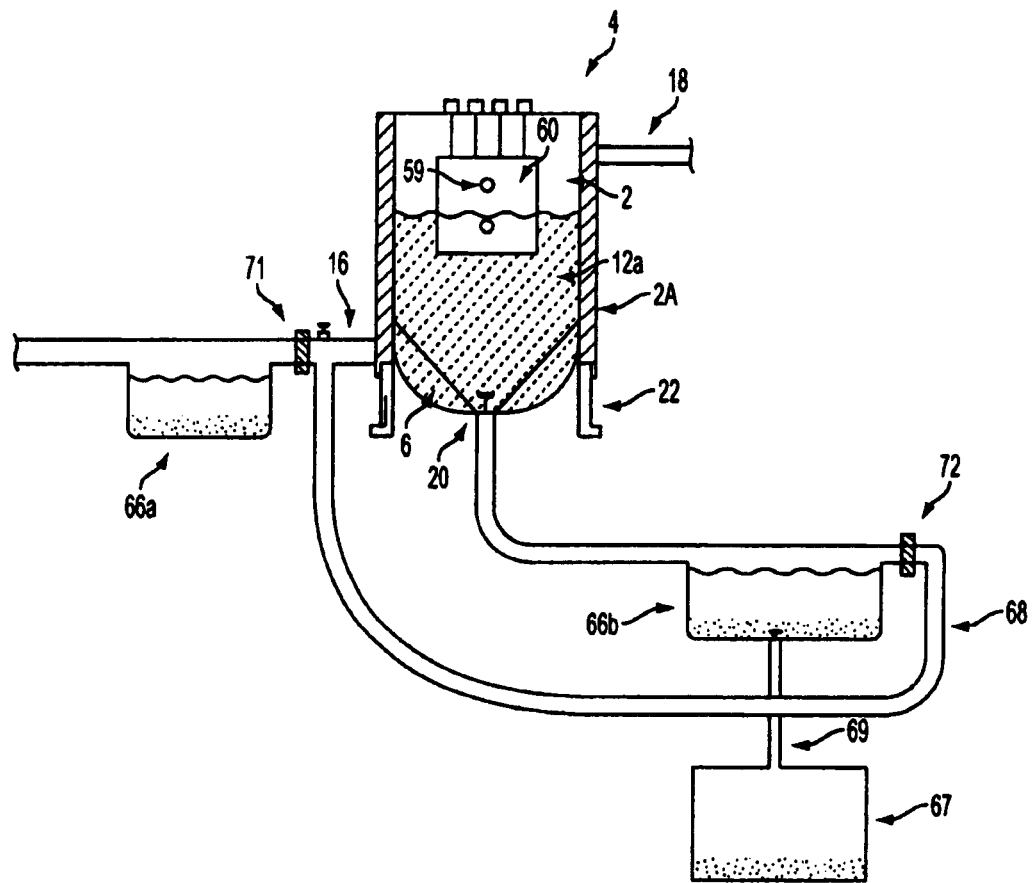
FIG. 5 shows one embodiment of a device of the present disclosure used for generating steam and purifying waste-liquid.
Figure 6:
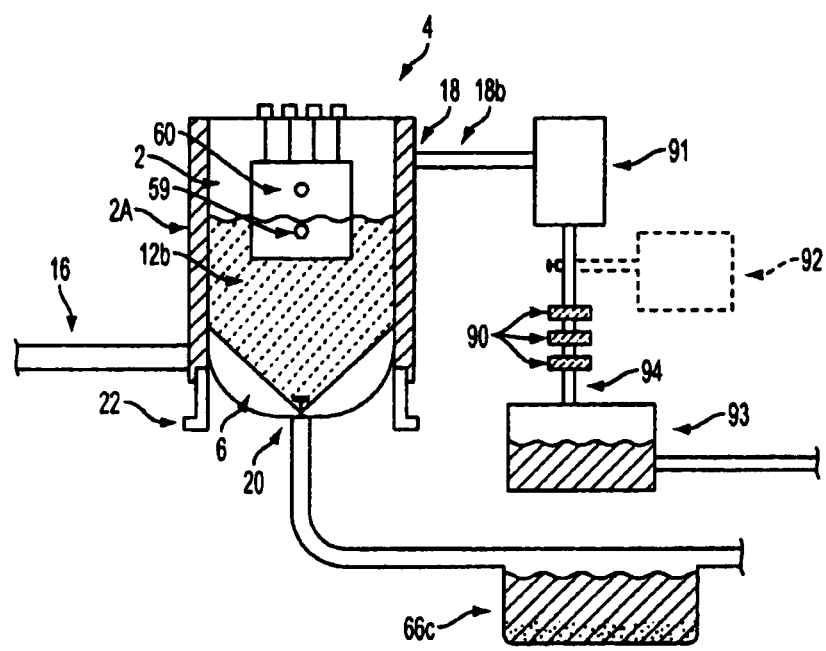
FIG. 6 shows one embodiment of a device of the present disclosure used for generating steam and desalinization of a liquid.

The vessel 2 may further comprise a sheath 2A (as shown in FIGS. 5 and 6). The sheath 2A covers, at least partially, the vessel 2. The sheath 2A may serve to protect the vessel from damage or the environment, to provide an insulating effect to the vessel 2 or a combination of the foregoing. In one embodiment, the sheath 2A provides an insulating effect to the vessel 2. In one embodiment, the sheath 2A covers 50% of the vessel 2, 75% of the vessel 2, 95% percent of the vessel 2 or 99% of the vessel 2. In a particular embodiment, the sheath 2A covers the vessel 2 except for the top portion 4. Various materials for manufacture of the sheath 2A include, but are not limited to, fiberglass. The sheath 2A may contain openings to receive and surround the inlet 16, outlet 18 and drain outlet 20 as well as the other components of the device 1.

The vessel 2 may further comprise a support 22 so that the device may be positioned as desired during operation. Any support known in the art may be used. In one embodiment, the support 22 is a brace secured to the vessel 2; in an alternate embodiment, the support 22 is a base portion configured to receive at least a portion of the top 4, bottom 6 or side wall 8 of the device 1. The support 22 may also function to protect the vessel 2 and/or to provide an insulating effect to the vessel 2 as described herein.

A transfer unit 30 is positioned in the interior portion of the vessel 2. The transfer unit 30 comprises a housing 32 and a plurality of activators 34. The housing 32 at least partially surrounds the activators 34. In one embodiment, the housing 32 contains one or more openings or perforations 59 that allow the liquid 12 to enter the housing 32 and contact the activators 34. The activators 34 are manufactured from a conductive material and are in communication with a power source 100 and the liquid 12, when present.

The power source 100 provides electrical energy to the activators 34. In one embodiment, the power source 100 may be a conventional electrical source, such as a commercial or residential power grid. In another embodiment, the power source 100 may be a standalone generator, such as a gas generator. In a further embodiment, the power source 100 may be a solar collector or wind-powered turbine or other alternative energy source. Any power source may be used in conjunction with the device 1. Such an electrical source may provide electrical energy in the form of alternating current or direct current; in one embodiment, alternating current is provided. The power source may have additional elements to modify the electrical energy to be usable by the device 1 (for example, a transformed or similar unit). Such elements are known in the art. Depending on the number of activators 34 present in the transfer unit 30, the transfer unit may receive different voltages. The design of the transfer unit 30 and the activators 34 is such that different amounts of voltage may be received without requiring changes in components of the system other than the addition of activators 34. Furthermore, the more activators 34 that are operating, the more voltage may be received by the device 1.

The device may further comprise a control unit 33. The control unit functions to regulate one or more functions of the device. In one embodiment, the control unit 33 (shown in FIG. 2) may be positioned between the power source 100 and the activators 34 to regulate the current supplied to the activators. The control unit 33 may further be in communication with one or more sensors, gauges or control valves the device. Exemplary sensors, gauges and valves include, but are not limited to, a fluid sensor, an impurity detector, a drain outlet valve, a pressure relief valve, a pressure sensor, a pressure gauge, a temperature gauge and an inlet control valve. In a particular embodiment, at least one of the foregoing is in communication with the control unit 33. In one embodiment, a liquid sensor 37 is placed in the interior 10. The liquid sensor 37 detects the presence of a liquid 12 in the interior 10 and signals the control unit 33 to energize the activators. In the absence of liquid 12, the liquid sensor 37 signals the control unit 33 to maintain the activators 34 in an un-energized state. In another embodiment, the control unit 33 controls an inlet control valve 39 on the inlet 16 to control the flow of fluid into the interior 10. The control unit may be connected to other sensors or control valves as known in the art or described herein.

In one embodiment, the transfer unit 30 comprises two activators 34A and 34B. In this embodiment, activator 34A is grounded and activator 34B is connected to the power source 100. As such, the transfer unit 30 receives 120 volts AC. In an additional embodiment, the transfer unit 30 comprises three activators 34A, 34B and 34C. In this embodiment, activator 34A is grounded and activators 34B and 34C are connected to the power source 100. As such, the transfer unit 30 receives 220 volts AC. In a further embodiment, the transfer unit 30 comprises four activators 34A, 34B, 34C and 34D. In this embodiment, activator 34A is grounded and activators 34B, 34C and 34D are connected to the power source 100. As such, the transfer unit 30 receives 440 volts AC. In still a further embodiment, the transfer unit 30 comprises five activators 34A, 34B, 34C, 34D and 34E. In this embodiment, activator 34A is grounded and activators 34B, 34C, 34D and 34E are connected to the power source 100. As such, the transfer unit 30 receives 680 volts AC. The number of activators 34 in the transfer unit can be increased as desired in order to provide more energy to the device 1 as is known in the art provided 1 of the activators serves as a ground. The activator that is grounded may be referred to as a ground activator and the activator(s) connected to the power source may be referred to as a hot activator. The increase in the number of activators 34 present in the transfer unit 30 increases the amount of energy delivered to the liquid 12 by the device 1. As a result, a transfer unit 30 with 4 activators 34 can provide more energy to an amount of liquid 12 in a given period of time than a transfer unit 30 having 2 activators 34, leading to quicker generation of heated liquid and/or steam. Furthermore, a transfer unit can be provided with more than two activators 34 (for example, four activators 34A-D) while only providing power to one activator (for example activator 34B). When additional energy is required, the remaining activators 34C and/or D can receive power, providing the device 1 the ability to respond to increasing or decreasing demand as may be required.

Figure 2:
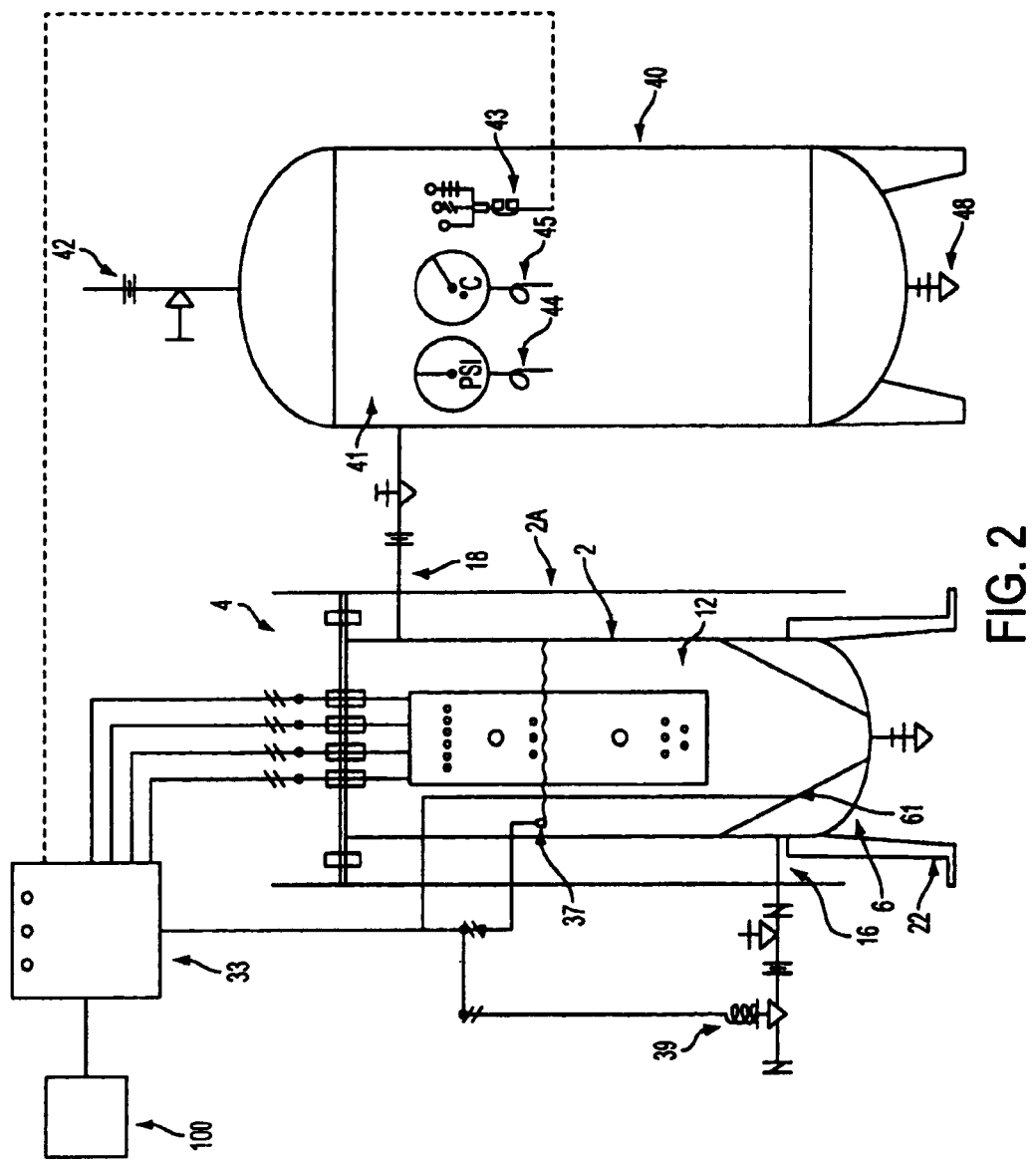
FIG. 2 shows one embodiment of a device of the present disclosure used for generating steam.

FIG. 2 shows one embodiment of the device 1 used to generate steam. As described above, the device 1 comprises a vessel 2 with a transfer unit 30 containing a plurality of activators 34 for heating a liquid 12; the vessel is surrounded by sheath 2A. In FIG. 2, the control unit 33 is shown to be in communication with the activators 34A-D, the liquid sensor 37 and the valve 39 to regulate operation of the device. As discussed above, when liquid 12 is detected by the liquid sensor 37, the control unit 33 energizes the activators 34B-D to heat the liquid 12. The portion of the activators 34B-D in contact with the liquid 12 heats the liquid to generate steam. The portion of the activators in contact with the steam may further heat the steam. The liquid 12 flows into the device 1 and occupies the space between the membranes 35 (see FIG. 4) of each activator 34. When the transfer unit 30 is energized, current flows into one or more (in one embodiment, all) of the activators 34B-D energizing the conducing membranes 35 forming the activators 34B-D. The energy is transferred from the activators 34B-D to the liquid, resulting in a net energy gain to the liquid and excitation of the liquid molecules. The more energy applied to the liquid via the activators 34B-D, the more energy is transferred to the liquid, resulting in a shorter time to generated heated liquid and or steam.

The steam is transmitted through outlet 18 to a storage tank 40 tank where the steam is stored and/or dried for further use as desired. The storage tank comprises an inlet 41 to receive the outlet 18 from the device 1 and an outlet 42 to transfer the steam to a device for further use. The storage tank may further comprise a pressure relief valve 47 and a drain valve 48. The storage tank 40 may further comprise various gauges and device for monitoring, such as, for example, a pressure sensor 43, a pressure gauge 44 and temperature gage 45. One or more of the foregoing may be in communication with the control unit 33 of the device 1.

Figure 3:
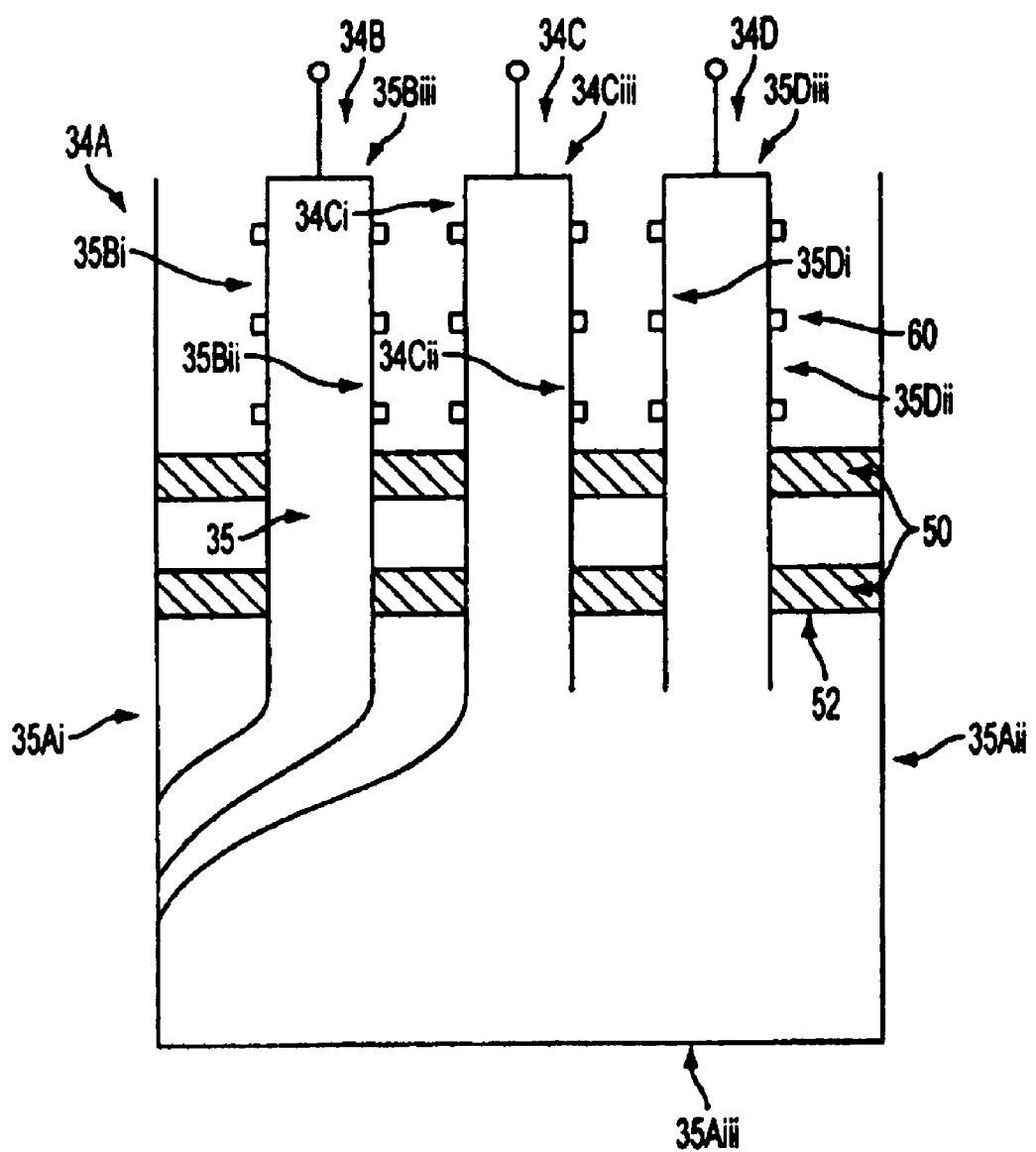
FIG. 3 shows a cross sectional view of one embodiment of a transfer unit of the present disclosure comprising 4 activators.
Figure 4:
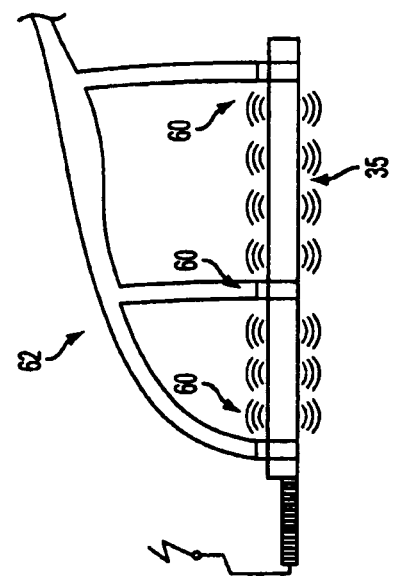
FIG. 4 shows one embodiment of the membranes of the activators
Figure 4:
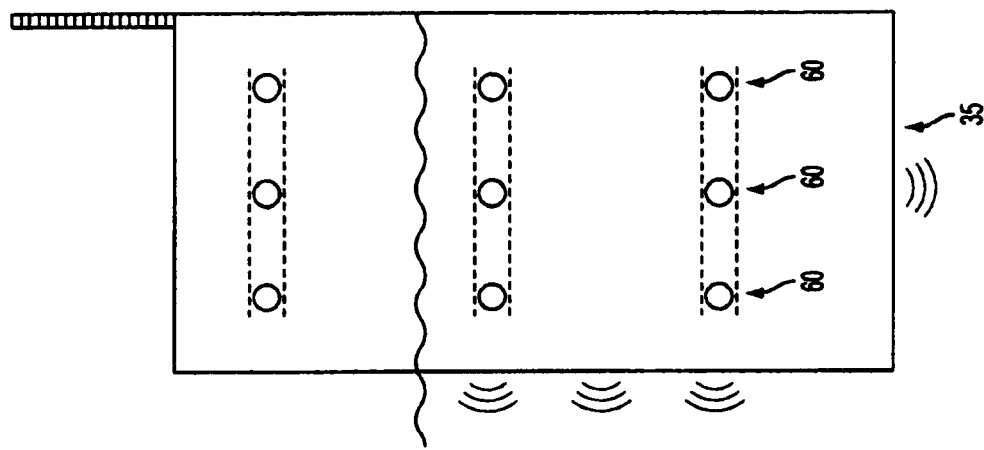

FIGS. 3 and 4 illustrate exemplary embodiments of the activators 34. In one embodiment, each activator comprises two membranes, each membrane having a first end and a second end, the membranes being in communication with one another on at least one of the first or second ends. In one embodiment, the membranes are in communication with one another on only one of the first or second ends. FIG. 3 provides an exemplary illustration of a transfer unit 30 having four activators 34A-D. Activator 34A is the ground activator and comprises two membranes 35Ai, and 35Aii joined by segment 35Aiii at the first end of membranes 35Ai and 35Aii. Activators 34B-D are the hot activators. Activator 34B comprises two membranes 35Bi and 35Bii joined by segment 35Biii at the first end of membranes 35Bi and 35Bii. Activator 34C comprises two membranes 35Ci and 35Cii joined by segment 35Ciii at the first end of membranes 35Ci and 35Cii. Activator 34D comprises two membranes 35Di and 35Dii joined by segment 35Diii at the first end of membranes 35Di and 35Dii.

In one embodiment, the second ends of one or more of the membranes of the hot activators are in communication with at least one membrane of the ground activator. Such a configuration provides for control of the amperage in the system and prevents fluctuation of the amperage over time. In one embodiment, the second end of one membrane of a hot activator is in communication with a single membrane of the ground activator. In another embodiment, two, three or four or more second ends of a membrane of a hot activator are in communication with a single membrane of the ground activator. For example, as shown in FIG. 3, the second ends of membranes 35Bi, 35Bii and 35Ci are joined to membrane 35Ai. The manner in which one or more of the membranes of the activators are joined may be varied, with the example shown in FIG. 3 being illustrator only. In one embodiment, the second end(s) of the hot activator(s) are connected to a membrane of the ground activator such that the second end(s) form an "S" shape or a sigmoidal configuration. As discussed above, other configurations may also be used. Test configurations may be evaluated for control of amperage using methods known in the art.

The activators 34 may be held in place by a spacer bar 50 that extends across, at least partially, the interior 10 of the vessel 2. The spacer bar 50 may position the activators 30 in a desired configuration within the interior 10. The spacer bar 50 may further contain insulating elements 52 to electrically isolate the individual activators 30 from one another. More than 1 spacer bar may be included if desired.

As discussed above, the membranes 35 are manufactured from a conductive material. For the purpose if the present disclosure, a "conductive material" is a material that contains a movable electric charge. In one embodiment, the conducing material is a metal and the movable electric charge is an electron. Exemplary metals include, but are not limited to, silver, copper, aluminum, platinum and titanium; mixtures of the foregoing are also included. Exemplary alloys include, but are not limited to, brass and stainless steel; other alloys include a metal (such as, but not limited to silver or copper) containing one or more of the following: osmium, iridium, palladium, zinc, ruthenium and rhodium. In one embodiment, the membranes 35 are manufactured from aluminum, stainless steel, gold, silver, platinum or copper. In another embodiment, the membranes 35 are manufactured from aluminum or stainless steel.

The membranes 35 may further comprise one or more openings 60 in their surface. The openings 60 serve as a conduit to capture and collect impurities (for example, salt, minerals and contaminants) that may be present in the liquid 12. In one embodiment, the openings 60 extend through the membranes 35 and the boundaries of the openings 60 are formed by the membranes 35. As the membranes 35 are manufactured from a conducting material, the openings 60 are subject to electrical current flowing through the membranes 35. As a result, a magnetic field may be generated around and within the openings 60 to capture impurities in the liquid. The openings 60 may be in communication with openings on the same or other membranes and/or with the bottom of the interior 10 or both. In one embodiment, tubes 62 are used to accomplish this purpose. The tubes 62 may be manufactured from any material from which the membranes are used and in one embodiment, the same material is used in the manufacture of the membranes 35 and the tubes 62. In one embodiment, as the liquid 12 passes around and/or through the openings 60, impurities in the liquid are captured by the openings 60 and enter the tubes 62 and are removed from the bulk liquid. The impurities then move down the tubes 62 as described below.

In the embodiment shown in FIG. 4, the openings 60 on a membrane 34 are in communication with conduits 62 to transport impurities in the liquid 12 to the bottom of the interior portion where the impurities settle to the conical portion 14 at the bottom of the vessel 2 in proximity to the drain outlet 20. As the impurities are removed from the bulk liquid, encrustation of the membranes 35 by the impurities is reduced or eliminated, increasing the efficiency of the activators 34 over the life of the device 1. The impurities collected may be removed by opening the drain outlet and removing the impurities along with a portion of the liquid 12. This process may be controlled by a detector 61 which upon detecting a certain level or amount of impurities automatically open the drain outlet 20 until the impurities are below a predetermined amount or for a specific amount of time. Alternatively, the drain outlet 20 may be controlled manually. The detector may be in communication with the control unit 33.

The device of the present disclosure may be used for a number of purposes, such as, but not limited to, heating a liquid or generating steam. The principles of operation of the transfer unit and the activators remain the same. In another embodiment, the device of the present disclosure may be used to treat waste-liquid. In one application of such an embodiment, the waste-liquid is a byproduct of an industrial process. In a specific embodiment, the industrial process is the manufacture of concrete. However, the device may be used with any waste-liquid generated by an industrial process that renders the liquid unfit for re-use. In yet another embodiment, the device of the present disclosure may be used to desalinate a liquid. While the principles of operation of the device remain the same, the device may be modified to achieve specific purposes. Exemplary modifications to such devices for the treatment of a waste-liquid and desalinization are provided below In one embodiment, the device is used to remove contaminates/impurities from a waste-liquid. As the waste-liquid contains impurities, the impurities may be removed through the operation of the device. The waste liquid may be subject to pretreatment prior to being introduced into the device. However, pretreatment is optional and the waste-liquid may be introduced directly into the device via inlet 16. When pretreatment of the waste-liquid is desired, the waste-liquid may be subject to processes that remove larger solid contaminates from the waste-liquid. In one embodiment, such processes are gravitational settling and filtration, although other techniques may be used; a combination of gravitational settling and filtration may also be used.

For gravitational settling the waste-liquid may be introduced into a settling tank for a period of time. In one embodiment, the settling tank is a reservoir in which the waste-liquid flows through; gravity acts of the solid contaminates and they settle to the bottom of the reservoir and are removed from the waste-liquid.

Filtration may be accomplished by any means known in the art using a single filter or more than 1 filter. The filters may be selected to remove solid contaminates over a selected size range. Such filters and their use are known in the art.

An exemplary device for use in the treatment of a waste-liquid is shown in FIG. 5. The device operates as described above. Waste liquid 12a is obtained for treatment by the device. In one embodiment, the waste-liquid is subject to pretreatment before being introduced into the device via inlet 16. In FIG. 5, both gravitational settling and filtration are illustrated; however, both processes are not required in every embodiment of the device. Waste-liquid 12a is flowed through a settling tank 66a. Gravity acts on the contaminate particles causing them to settle to the bottom portion 70 of the settling tank, removing such particles from the waste-liquid. The process may be continuous in that waste-liquid continuously flows through the settling tank 66a or may be a batch process in which a quantity of waste-liquid is introduced into the settling tank 66a and held for a period of time to allow gravity to remove the solid contaminants. The waste-liquid may also be subject to one or more filtration steps by passing the waste-liquid through one or more filters 71.

In any case, the pretreated waste-liquid in introduced into the device. As stated above, the device acts on the liquid as described herein. The operation of the activators removes additional contaminates from the waste-liquid 12a. The contaminants are collected as described herein and transferred to the bottom portion 6 of the vessel 2 for removal via the drain outlet 20.

The contaminants are removed, along with a portion of the waste-liquid. The removed material may be stored in a second settling tank 66b as described above to collect the impurities removed by the device 1 from the waste-liquid. The storage in settling tank 66b allows the contaminants to further settle out of the waste-liquid 12a over time. The liquid 12a in the settling tank 66b may be reintroduced to the device 1 through the inlet 16 via a recirculation conduit 68. The conduit 68 may be equipped with a filtration unit 72 to filter the liquid if desired. Furthermore, the contaminants collected in settling tanks 66a and 66b may be collected and disposed of as required, or in cases where uses for the contaminants may be found, transferred to a storage tank 67 through conduit 69 and collected for utilization. Steam generated by operation of the device may be used as described herein. Furthermore, water may be regenerated from the steam as described below in FIG. 6.

In another embodiment, the device is used to desalinate a liquid. The process removes salts from the liquid, producing a purified liquid fit for consumption by human or for use in agricultural or industrial processes. An exemplary device for use in the treatment of a waste-liquid is shown in FIG. 6. The device operates as described above. Liquid 12b containing a salt is obtained for treatment by the device. In one embodiment, liquid 12b is seawater. The liquid 12b is introduced into the device. As stated above, the device acts on the liquid as described herein. The operation of the activators removes dissolved salts from the liquid 12b. The removed salts are collected as described herein and transferred to the bottom portion 6 of the vessel 2 for removal via the drain outlet 20. The salts are removed, along with a portion of the waste-liquid. The removed salts may be stored in a settling tank 66c as described above to collect the removed salts. The salts may be recovered by evaporation if desired. The liquid 12b in the settling tank 66c may be reintroduced to the device 1 through the inlet 16 via a recirculation conduit as described above for FIG. 5. The salts may be collected and disposed of as required or collected for utilization.

Through the operation of the device, steam is generated. The steam is removed from the device via outlet 18. The steam passes through conduit 18b to a condenser 91. The condenser operates as known in the art and condenses the steam to generate a treated liquid. The treated liquid may be collected and utilized at this point in a storage tank 92 or subject to further processing steps. The treated liquid may be subject to one or more filtration steps by passing through filters 90. In one embodiment, the treated liquid is subject to filtration by a charcoal filter. The filtration step may remove impurities from the treated liquid or be used to improve a characteristic of the treated water, such as, but not limited to, taste. The result is a filtered liquid that is fit for utilization as described above. The filtered liquid may transferred from the condenser 91 to a storage tank 93 by conduit 94 for storage until used. Alternatively, the filtered liquid may be transferred by conduit 94 directly to a point of use. At any point in the process the liquid may be treated with one or more agents. In one embodiment, the agent is fluorine or another agent commonly used in water treatment.

DEFINITIONS

The terms "about" and "approximately" shall generally mean an acceptable degree of error or variation for the quantity measured given the nature or precision of the measurements. Typical, exemplary degrees of error or variation are within 20 percent (%), preferably within 10%, and more preferably within 5% of a given value or range of values. For biological systems, the term "about" refers to an acceptable standard deviation of error, preferably not more than 2-fold of a give value. Numerical quantities given herein are approximate unless stated otherwise, meaning that the term "about" or "approximately" can be inferred when not expressly stated.
Results In the following results, the methods used were those methods specified in the present disclosure and the references cited therein. The results serve to provide various embodiments of the device described. The disclosure is not meant to be limited to the specific embodiments described.

Example 1

In this example, a device according to the present disclosure was provided with a single transfer unit comprising 4 activators. The device was used to heat 100 liters of water from an initial temperature of 15° C. to 60° C. The embodiment of the device used in this Example had the configuration provided in FIG. 2 of the present disclosure.

As can be seen in Table 1, the device of the present disclosure accomplished the heating in a time period of 4 minutes at an estimate of energy cost of $0.2069 USD This is compared to an estimate of energy cost of $0.3001 USD (Gas Boiler) or $0.4069 USD (electrical Resistance Boiler) using prior art boilers common in the art. As can be seen, the use of the device of the present disclosure resulted in a significant energy saving compared to devices of the prior art. In addition, to the Energy savings, the device incorporates other benefits such as but not limited to, increased safety, smaller physical footprint and reduced environmental pollution.

TABLE 1

| | |
|---|---|
| Input voltage | 440 VAC |
| Amperage | 28 amps (18.48 kw/h.) |
| Water volume | 100 liters |
| Initial water temerpature (sic) | 15° C. |
| Final water temperature | 60° C. |
| Time to heat water | 4 minutes |
| Energy costs | $0.2069 USD |

Example 2

In this example, a device according to the present disclosure was provided with a single transfer unit comprising 4 activators. The device was used to generate steam (at a temperature of 170° C. from 20 liters of water (initial temperature of 15° C.). The embodiment of the device used in this Example had the configuration provided in FIG. 2 of the present disclosure.

As can be seen in Table 2, the device of the present disclosure accomplished steam generation in a time period of 5 minutes at an energy estimate of energy cost of $0.2585 USD. This is compared to an energy cost of $0.3510 USD using a prior art boiler common in the art.

As can be seen, the use of the device of the present disclosure resulted in a significant energy saving compared to devices of the prior art. In addition, to the energy savings, the device incorporates other benefits such as but not limited to, increased safety, smaller physical footprint and reduced environment pollution.

TABLE 2

| | |
|---|---|
| Input voltage | 440 VAC |
| Amperage | 28 amps |
| Water volume | 20 liters |
| Initial water temperature | 15° C. |
| Steam temperature | 170° C. |
| Time to heat water | 5 minutes |
| Energy costs | $0.2585 USD |

Example 3

In this example, a device according to the present disclosure was provided with a single transfer unit comprising 4 activators. The device was used to heat water inquantities (sic) encountered in residential and small business uses. The annual costs of hot water production are provided in Table 3.

As can be seen in Table 3, the device of the present disclosure accomplished hot water generation at a substantially reduced costs as compared to three conventional water heaters.

TABLE 2

| | AGS# | Natural Gas* | Electric** | LPG |
|---|---|---|---|---|
| Tank Capacity (Gal) | 155 | 40-50 | 40-50 | 50 |
| Daily Use (Gal) | 64 | 64 | 64 | 64 |
| Annual Cost | $141 | $268 | $492 | $663 |

AGS denotes a device of the present disclosure
*denotes Rheem RHE PRO40-2/52-2
**denotes Rheem PRO40NE 2

The foregoing description illustrates and describes the methods and other teachings of the present disclosure. Additionally, the disclosure shows and describes only certain embodiments of the methods and other teachings disclosed, but, as mentioned above, it is to be understood that the teachings of the present disclosure are capable of use in various other combinations, modifications, and environments and is capable of changes or modifications within the scope of the teachings as expressed herein, commensurate with the skill and/or knowledge of a person having ordinary skill in the relevant art. The embodiments described hereinabove are further intended to explain best modes known of practicing the methods and other teachings of the present disclosure and to enable others skilled in the art to utilize the teachings of the present disclosure in such, or other, embodiments and with the various modifications required by the particular applications or uses. Accordingly, the methods and other teachings of the present disclosure are not intended to limit the exact embodiments and examples disclosed herein. All references cited herein are incorporated by reference as if fully set forth in this disclosure.

What is claimed:

1. A device for generating a heated liquid or steam, the device comprising:
   a. a vessel having an interior portion for containing a liquid under pressure; and
   b. a transfer unit in the interior portion, the transfer unit comprising a plurality of activators, each of the activators comprising 2 membranes, each of the membranes having a first end and a second end and each of the membranes of each activator being in communication with the other on one of the first and second ends, wherein one of the activators is a ground activator and at least one of the activators is a hot activator, the hot activator being in communication with a power source to supply power to the hot activator.

2. The device of claim 1, wherein the power source is an electrical generator.

3. The device of claim 1, wherein the power source supplies alternating current.

4. The device of claim 1, wherein the device further comprises a control unit.

5. The device of claim 4, wherein the control unit regulates power supplied to the hot activator and to regulate one or more functions of the device.

6. The device of claim 1, wherein the device comprises a first activator and a second activator, wherein the first activator is a ground activator and the second activator is a hot activator.

7. The device of claim 6, wherein the second end of at least one membranes of the second activator is in contact with the ground activator.

8. The device of claim 7, wherein the contact is provided by joining the second end of at least one membrane of the second activator to the ground activator using a sigmoidal configuration.

9. The device of claim 6, wherein the transfer unit receives 120 volts alternating current.

10. The device of claim 1, wherein the device comprises a first activator, a second activator and a third activator, wherein the first activator is a ground activator and the second and third activators are hot activators.

11. The device of claim 10, wherein the second ends of the membranes of at least one of the second or third activators are in contact with the ground activator.

12. The device of claim 11, wherein the contact is provided by joining the second end of at least one membrane of at least one of the second or third activators to the ground activator using a sigmoidal configuration.

13. The device of claim 10, wherein the transfer unit receives 220 volts alternating current.

14. The device of claim 1, wherein the device comprises a first activator, a second activator, a third activator and a fourth activator, wherein the first activator is a ground activator and the second, third and fourth activators are hot activators.

15. The device of claim 14, wherein the second ends of the membranes of at least one of the second, third or fourth activators are in contact with the ground activator.

16. The device of claim 15, wherein the contact is provided by joining the second end of at least one membrane of at least one of the second, third or fourth activators to the ground activator using a sigmoidal configuration.

17. The device of claim 14, wherein the transfer unit receives 440 volts alternating current.

18. The device of claim 1, wherein the device comprises a first activator, a second activator, a third activator, a fourth activator and a fifth activator, wherein the first activator is a ground activator and the second, third, fourth and fifth activators are hot activators.

19. The device of claim 18, wherein the second ends of the membranes of at least one of the second, third, fourth or fifth activators are in contact with the ground activator.

20. The device of claim 19, wherein the contact is provided by joining the second end of at least one membrane of at least one of the second, third, fourth of fifth activators to the ground activator using a sigmoidal configuration.

21. The device of claim 18, wherein the transfer unit receives 680 volts alternating current.

22. The device of claim 1, wherein the transfer unit comprises 2 or more activators.

23. The device of claim 22, wherein one of the activators is a ground activator and the remaining activators are hot activators.

24. The device of claim 23, wherein the second end of at least one membranes of at least one of the hot activators is in contact with the ground activator.

25. The device of claim 24, wherein the contact is provided by joining the second end of at least one membrane of at least one of the hot activators to the ground activator using a sigmoidal configuration.

* * * * *